United States Patent
Stewart et al.

(10) Patent No.: US 12,552,219 B2
(45) Date of Patent: Feb. 17, 2026

(54) DISCONNECTABLE SWAY BAR LINK (71) Applicant: Super ATV, LLC, Madison, IN (US)

(72) Inventors: Jason T. Stewart, Harvest, AL (US); Aaron Kirklin, Charlestown, IN (US)

(73) Assignee: Super ATV, LLC, Madison, IN (US)

( * ) Notice: Subject to any disclaimer, the term of this patent is extended or adjusted under 35 U.S.C. 154(b) by 0 days.

(21) Appl. No.: 18/999,166

(22) Filed: Dec. 23, 2024

(65) Prior Publication Data
US 2025/0303812 A1  Oct. 2, 2025

Related U.S. Application Data (60) Provisional application No. 63/572,550, filed on Apr. 1, 2024.

(51) Int. Cl.
B60G 21/055  (2006.01)
B60G 21/10  (2006.01)

(52) U.S. Cl.
CPC .................. B60G 21/10 (2013.01)

(58) Field of Classification Search
CPC ............. B60G 21/0556; B60G 21/10; B60G 2204/1224; B60G 2204/4232
See application file for complete search history.

(56) References Cited

U.S. PATENT DOCUMENTS 6,659,475 B2 * 12/2003 Clements ........... B60G 21/0556
267/188
7,887,072 B2 * 2/2011 Hauser ................ B60G 17/005
280/124.152
11,173,767 B2 11/2021 Cox
11,390,133 B2 7/2022 Cox
2021/0283975 A1 * 9/2021 Cox .................... B60G 21/073
2022/0105777 A1 4/2022 Cox

FOREIGN PATENT DOCUMENTS

DE  102006004204 B3 * 9/2007 ............. B60G 21/10

OTHER PUBLICATIONS https://jksmfg.com/products/quicker-disconnect-sway-bar-links-2-5-6-0-lift-wrangler-jk dated Feb. 22, 2025 (pp. 3).
https://www.rockymountainsusp.com/jks5006.html dated Feb. 11, 2025 (pp. 2).

* cited by examiner

Primary Examiner — James A English
(74) Attorney, Agent, or Firm — Woodard, Emhardt, Henry, Reeves & Wagner, LLP (57) ABSTRACT A selectively engageable sway bar link for an off-road vehicle that includes a shaft with a first mounting point and a notch that is spaced apart from the first mounting point. The sway bar link includes a slide with a second mounting point and a detent mechanism. The shaft extends through the slide and the slide is selectively movable along the length of the shaft. The detent mechanism includes a locking member that, in a first state, engages the notch on the shaft to arrest movement of the slide relative to the shaft. In a second state, the locking member does not engage the notch. Further, in the first state, the slide is moveable relative to the shaft unless the locking member is longitudinally aligned with the notch in the shaft.

18 Claims, 8 Drawing Sheets

155 — Sliding and rotating the first tubular body of the slide relative to the second tubular body of the slide in a first direction, causing the guide within the track to be positioned from a first longitudinal position to a second longitudinal position and disengaging the locking member from the notch of the shaft.

160 — Sliding and rotating the first tubular body of the slide relative to the second tubular body of the slide in a second direction opposite the first direction, causing the guide within the track to be positioned from the second longitudinal position back to the first longitudinal position and engaging the locking member with the notch of the shaft.

*Fig. 10*

DISCONNECTABLE SWAY BAR LINK

CROSS-REFERENCE TO RELATED APPLICATIONS

This application claims the benefit of U.S. Provisional Patent Application, Ser. No. 63/572,550, filed Apr. 1, 2024, which is hereby incorporated by reference.

FIELD OF THE INVENTION

This invention generally relates to sway bars for vehicles, and more specifically to a selectively disconnectable sway bar link.

BACKGROUND OF THE INVENTION

The present disclosure relates to a disconnectable sway bar link. Sway bars, also known as an anti-roll bar, roll bar, anti-sway bar, or stabilizer bar, are part of a vehicles suspension that reduce the body roll of the vehicle during cornering or driving over rough/rocky terrain. The sway bar connects between the left and right wheels of the vehicle to transfer and/or balance the load between the two wheels. Sway bar links connect the sway bar to the left and right suspensions. However, sway bars can decrease the amount an axle can articulate. This can be significant in off road driving, where, at times, maximizing axle articulation is necessary for some terrain. For example, a driver may want their left and right front tires to be able to move up and down more independently from one another. With a sway bar connected, such movement is limited whereas if the sway bar is disconnected, the left and right front tires are able to move up and down more independently from one another.

To address this issue, disconnectable sway bars can be used where sway bar links can be selectively set with the suspension decoupled from the sway bar. In this way, the vehicle suspension can be selectively optimized for crawling over rough off road terrain while retaining the ability to selectively engage the sway bar for other driving conditions that require more vehicle stability.

Prior art disconnectable sway bar links include mechanical, electrical and hydraulic options. However, the prior art mechanical links generally require an operator to manually lock or unlock the sway bar link by adding or removing a locking mechanism, respectively. Specific tools may be required for this operation and removed components must then be stored for future use, which creates the possibility of lost locking mechanisms. Prior art mechanical links may also require the suspension to be at a specific position to engage the locking mechanism, which can be difficult when the vehicle is not positioned on a flat surface. Thus, there is a need for improvement in the field.

SUMMARY OF THE INVENTION

The present disclosure relates to a disconnectable sway bar link for off-road vehicles. The sway bar link of the present disclosure is selectively configurable between a first state and a second state. In the first state, the sway bar link couples the sway bar to a specific wheel suspension, while in the second state, the sway bar link is flexible and the sway bar is not linked to a specific wheel suspension, allowing an operator to choose the configuration of the sway bar link depending on the driving conditions.

In one embodiment, the disconnectable sway bar link includes a shaft insertable within a slide. The slide is configured to move relative to the shaft, but includes a detent mechanism for selectively engaging a portion of the shaft to arrest said movement. In one embodiment, the detent mechanism comprises a locking member engageable with a notch in the shaft. When the locking member is engaged to the notch, the movement of the slide is arrested, and the sway bar link is in the first, rigid state. When the locking member is disengaged from the notch of the shaft, the slide is able to move relative to the shaft and the sway bar link is in the second, flexible state.

In one embodiment, the slide comprises two distinct components, a first tubular body and a second tubular body. The first and second tubular bodies include a guide and a respective track that receives the guide to alter the position of the two tubular bodies from a first longitudinal position and a second longitudinal position. The first longitudinal position defines the first, locked, rigid state of the sway bar link. In this state, a spring biases the first and second tubular bodies such that the locking mechanism is engaged with the notch of the shaft. In some embodiments, the locking mechanism is biased into the shaft by an internal protrusion located inside the inner cavity of the second tubular body. The second longitudinal position defines the second, unlocked, flexible state of the sway bar link. In this position, the locking member is not biased to engage the notch of the shaft, thus allowing movement of the slide relative to the shaft. Specifically, the locking member is received in an internal recess of the second tubular body.

A method of changing the sway bar link from a first, rigid state to a second, flexible state is also disclosed. Sliding and rotating the first tubular body relative to the second tubular body cause the sway bar link to change from the first state to the second state, or vice versa. Again, the state of the sway bar link is determined by the longitudinal position of the guide relative to the track between the first and second tubular bodies of the slide. Specifically, by sliding and rotating the first tubular body in a first direction, an internal protrusion of the second tubular body engages the locking mechanism and biases the locking mechanism into the notch. Conversely, by sliding and rotating the first tubular body in a second direction opposite the first, the locking member is disengaged from the notch allowing movement of the slide relative to the shaft.

DETAILED DESCRIPTION OF THE DRAWINGS

For the purposes of promoting an understanding of the principles of the invention, reference will now be made to certain embodiments and specific language will be used to describe the same. It will nevertheless be understood that no limitation of the scope of the invention is thereby intended, such alterations and further modifications, and such further applications of the principles of the invention as described herein being contemplated as would normally occur to one skilled in the art to which the invention relates. Additionally, in the detailed description below, numerous alternatives are given for various features. It will be understood that each such disclosed alternative, or combinations of such alternatives, can be combined with the more generalized features discussed in the Summary above, or set forth in the embodiments described below to provide additional disclosed embodiments herein.

The uses of the terms "a" and "an" and "the" and similar references in the context of the disclosure (especially in the context of the following claims) are to be construed to cover both the singular and the plural unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element.

The present disclosure relates to a selectively disconnectable sway bar link for off-road vehicles. The sway bar link of the present disclosure is selectively configurable between a first state and a second state. In the first state, the link provides rigidity, while in the second state the link is flexible, allowing an operator to choose the configuration of the link depending on the driving conditions.

In one embodiment, the disconnectable sway bar link includes a shaft insertable within a slide. The slide is configured to move relative to the shaft, but includes a detent mechanism for selectively engaging a portion of the shaft to arrest said movement. In one embodiment, the detent mechanism comprises a locking member engageable with a notch in the shaft. When the locking member is engaged to the notch, the movement of the slide is arrested, and the sway bar link is in the first, rigid state. When the locking member is disengaged from the notch of the shaft, the slide is able to move relative to the shaft and the sway bar link is in the second, flexible state.

In one embodiment, the slide comprises two distinct components, a first tubular body and a second tubular body. The first and second tubular bodies include a guide and a respective track that receives the guide to alter the position of the two tubular bodies from a first longitudinal position and a second longitudinal position. The first longitudinal position defines the first, locked, rigid state of the disconnectable sway bar link. In this state, a spring biases the first and second tubular bodies such that the locking mechanism is engaged with the notch of the shaft. In some embodiments, the locking mechanism is biased into the shaft by an internal protrusion located inside the inner cavity of the second tubular body. The second longitudinal position defines the second, unlocked, flexible state of the disconnectable sway bar link. In this position, the locking member is not biased to engage the notch of the shaft, thus allowing movement of the slide relative to the shaft. Specifically, the locking member is received in an internal recess of the second tubular body.

A method of changing the disconnectable sway bar link from a first, rigid state to a second, flexible state is also disclosed. Sliding and rotating the first tubular body relative to the second tubular body cause the disconnectable sway bar link to change from the first state to the second state, or vice versa. Again, the state of the disconnectable sway bar link is determined by the longitudinal position of the guide relative to the track between the first and second tubular bodies of the slide. Specifically, by sliding and rotating the first tubular body in a first direction, an internal protrusion of the second tubular body engages the locking mechanism and biases the locking mechanism into the notch. Conversely, by sliding and rotating the first tubular body in a second direction opposite the first, the locking member is disengaged from the notch allowing movement of the slide relative to the shaft.

Figure 1:
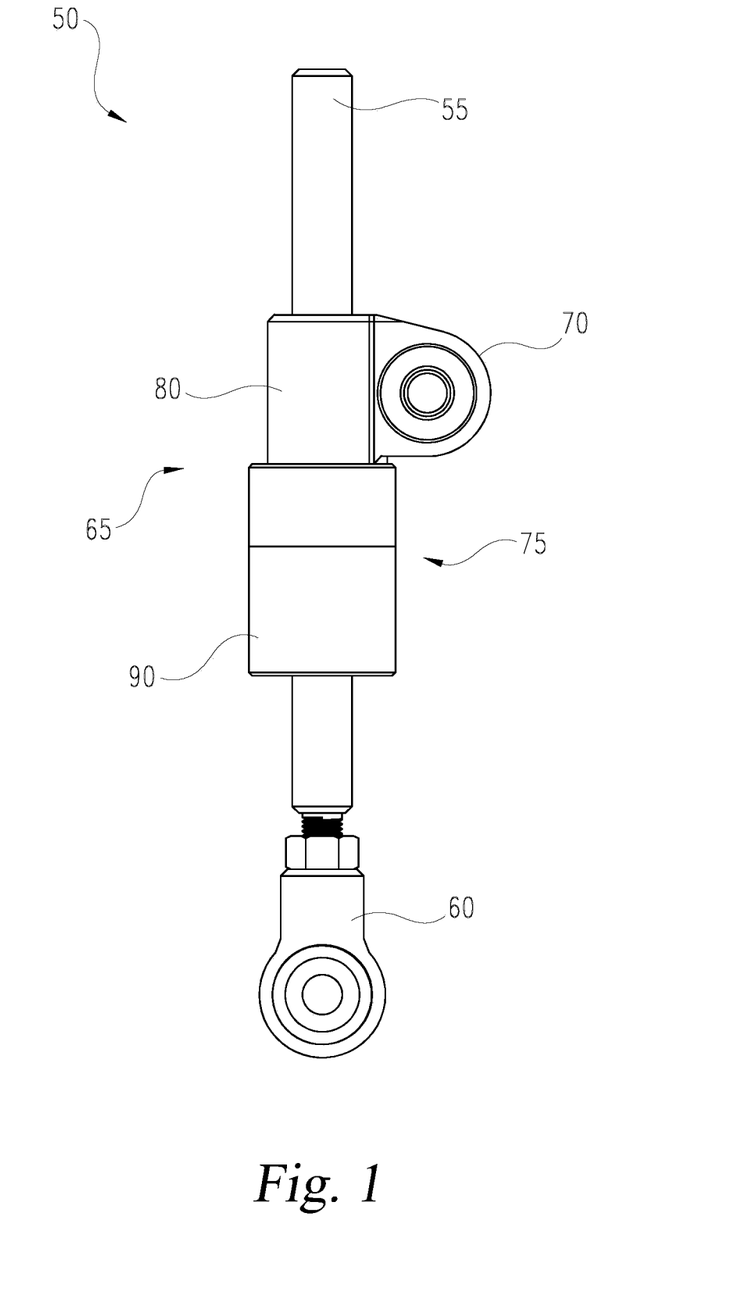
FIG. 1 is a side view of a sway bar link according to one embodiment of the present disclosure.

FIG. 1 is side view of an embodiment of a disconnectable sway bar link 50 according to the present disclosure. The disconnectable sway bar link 50 includes a shaft 55. The shaft includes a first mounting point 60 at a first end of the shaft 55. Shaft 55 extends through a slide 65. The slide 65 is selectively movable along the length of shaft 55. The slide 65 includes a second mounting point 70 and a detent mechanism 75 that selectively locks the slide 65 relative to the shaft 55. The slide 65 comprises a first tubular body 80 and a second tubular body 90. In this embodiment, the second tubular body 90 is movable relative to the first tubular body 80.

The first mounting point 60 and the second mounting point 70 are configured to secure the disconnectable sway bar link 50 within the suspension componentry of a vehicle. For example, in some embodiments, first mounting point 60 is connected to the sway bar, while the second mounting point 70 is attached to an axle of the vehicle. In other embodiments the first mounting point 60 is attached to the axle, while the second mounting point 70 is attached to the sway bar. In some embodiments, the first and second mounting points 60 and 70 comprise bushings. Other mechanical connection means are envisioned within the spirit of the present disclosure as would be appreciated by one of skill in the art.

The selective movement of slide 65 relative to shaft 55 via engagement and/or disengagement of detent mechanism 75 provides a disconnectable sway bar link 50 having a first state and a second state. In the first state, the detent mechanism 75 (described in more detail below) is biased to engage with a portion of shaft 55 to arrest movement of the slide 65 relative to the shaft 55. In the second state, the detent mechanism 75 does not engage a portion of the shaft 55 allowing the slide 65 to move relative to the shaft 55. Said differently, the first state provides a rigid sway bar link 50, while the second state provides a flexible sway bar link 50. Changing the disconnectable sway bar link 50 from the first state to the second state requires engagement and/or disengagement of the detent mechanism 75, respectively. In this embodiment, this change in state of disconnectable sway bar link 50 does not require removing any pieces from the link 50 or the corresponding suspension componentry nor are tools required. Furthermore, in this embodiment, the detent mechanism 75 does not have to be precisely aligned with a specific part of shaft 55, as the detent mechanism 75 is biased to engage shaft 55 when properly aligned which can occur when the vehicle is operating and the disconnectable sway bar link 50 articulates due to movement of the vehicle's suspension.

Figure 2:
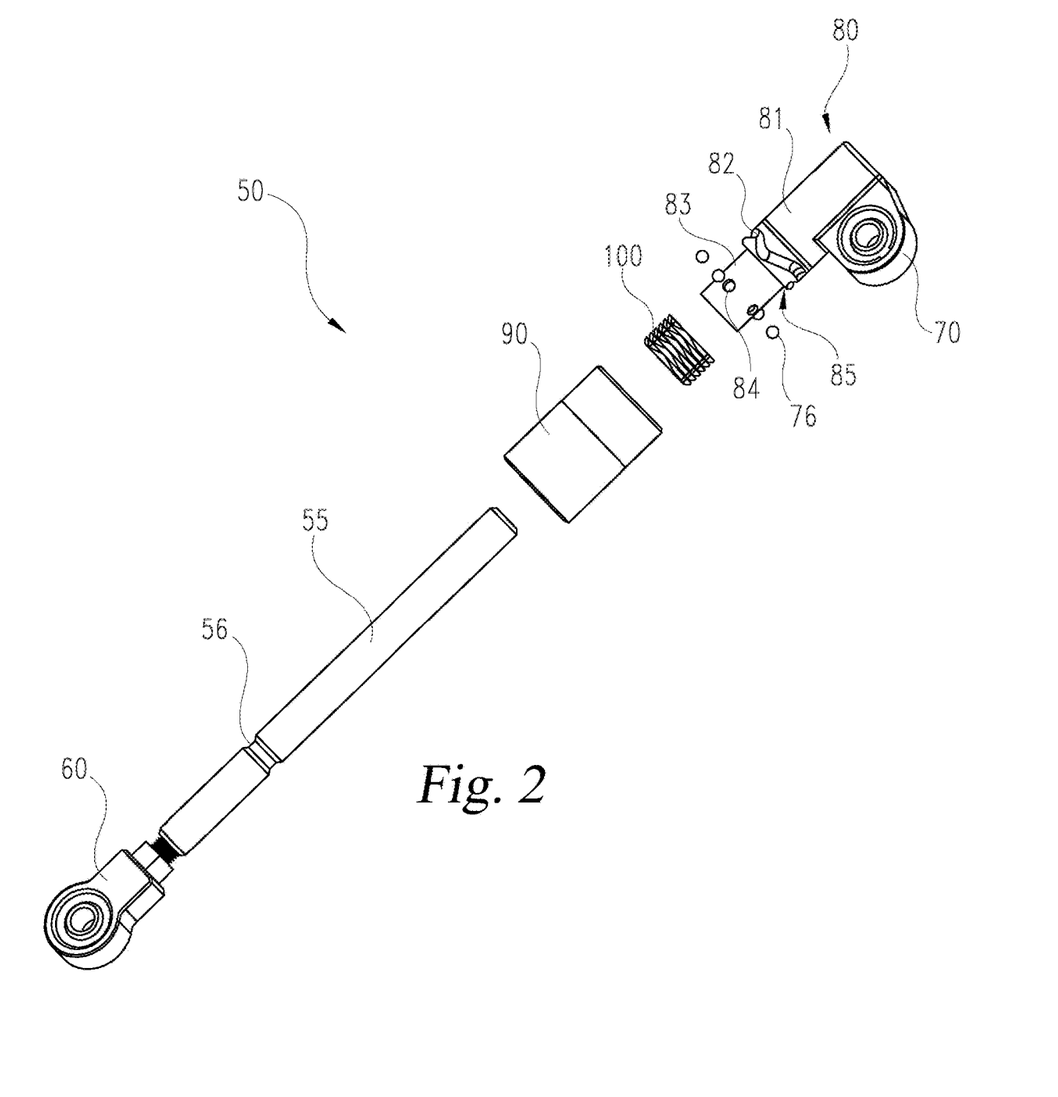
FIG. 2 is an exploded assembly view of the sway bar link of FIG. 1.

FIG. 2 is an exploded view of the disconnectable sway bar link 50 illustrated in FIG. 1. The first tubular body 80 includes a locking member 76 that comprises a portion of the detent mechanism 75. In this embodiment, the locking mechanism 76 comprises a spherical bearing. The locking mechanism 76 is configured to selectively engage a notch 56 in the shaft 55 located apart from the first mounting point 60. In this embodiment, the notch 56 comprises a groove that circumscribes/extends around the circumference of shaft 55. When the locking mechanism 76 is engaged with notch 56, movement of slide 65 relative to shaft 55 is prevented, thus providing a rigid sway bar link 50. The locking mechanism will be described in further detail below.

The disconnectable sway bar link 50 also includes a spring 100 located between the first and second tubular bodies 80 and 90. In this embodiment, the spring 100 comprises a wave disc spring. The spring 100 biases the first tubular body 80 relative to the second tubular body 90.

Figure 3:
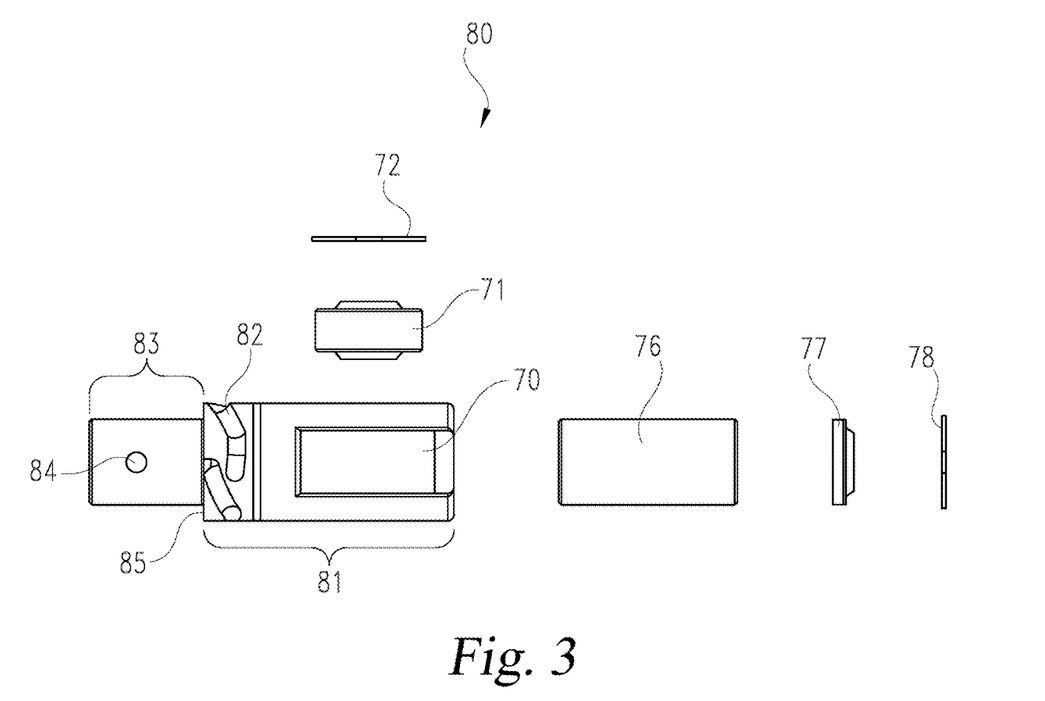
FIG. 3 is an exploded assembly view of an embodiment of a first tubular body of a slide.

FIG. 3 is an exploded view of an embodiment of the first tubular body 80 of the slide 65. In this embodiment, second mounting point 70 includes a bushing 71 secured by retainer ring 72. Optionally, first tubular body 80 includes an insert 76. The insert 76 alters the inner diameter of first tubular body 80 to correspond to the diameter of shaft 55. In this manner, slide 65 can be used with shafts 55 of various sizes. Insert 76 may also operate as a plain bearing facilitating movement of shaft 55 relative to first tubular body 80. The insert 76 may include a seal 77 to block water or other liquids and debris from entering slide 65. The insert 76 and seal 77 are secured within first tubular body 80 by retainer ring 78.

The first tubular body 80 includes a first portion 81 and a second portion 83 that defines external shoulder 85 therebetween due to a difference in diameter. As shown, the first portion 81 has a larger diameter than second portion 83. The first portion 81 includes a track 82 that extends radially around at least a portion of said first portion 81 between a first longitudinal position and a second longitudinal position. The second longitudinal position is longitudinally offset from the first longitudinal position. The track 81 is configured to receive a guide of the second tubular body 90, which work in cooperation to constrain the movement of the second tubular body 90 relative to the first tubular body 80. Although shown as a recess on the first tubular body 80, the track 81 may be a recess located on the second tubular body 90. In either event, the guide is placed on the tubular body 80, 90 that does not include the track 81.

The second portion 83 includes one or more holes 84. The hole 84 is configured to receive locking member 76 of detent mechanism 75. When engaged in a locked position, the locking member 76 protrudes through hole 84 and into notch 56, thus securing slide 65 relative to shaft 55.

Figure 4:
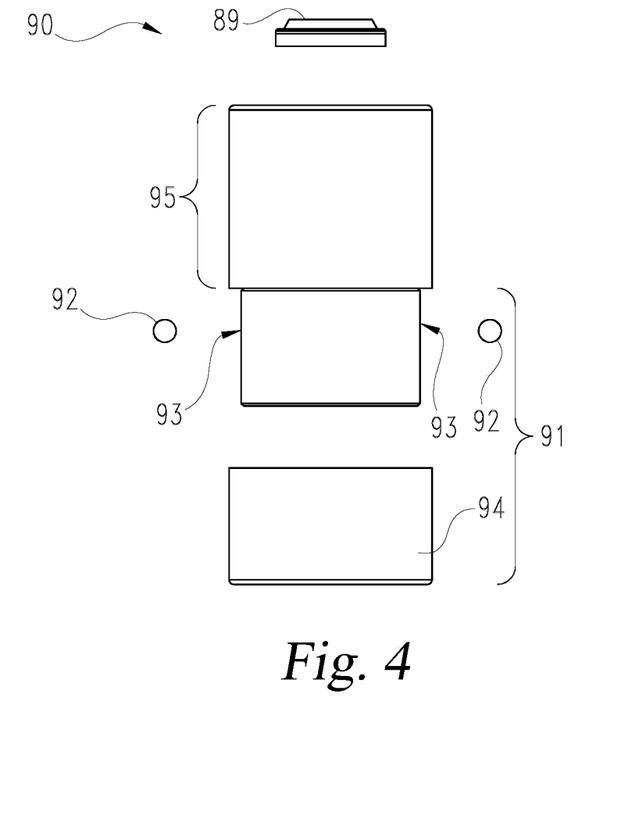
FIG. 4 is an exploded assembly view of an embodiment of a second tubular body of a slide.

FIG. 4 is an exploded view of second tubular body 90. The second tubular body includes a third portion 91 and a fourth portion 95. The third portion 91 includes a guide 92. In this embodiment, guide 92 comprises a bearing. Guide 92 is configured to engage the track 82 of the first tubular body 80. The guide 92 is at least partially insertable through a bore 93 located in the wall of the third portion 91 of the second tubular body 90. The guides 92 are outwardly secured by collar 94, which prevents guide(s) 92 from backing off. Seal 89 is optionally inserted at the end of the fourth portion 95 to block liquid and debris from entering the slide 65. Seals 77, 89, however, do not generate enough friction to prevent movement of the slide 65 relative to shaft 55.

Figure 5:
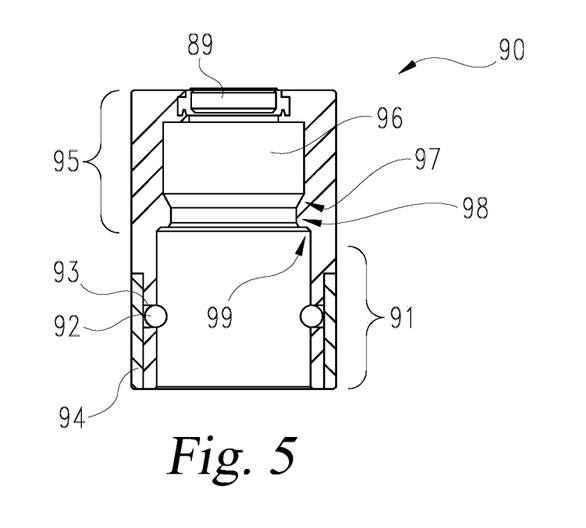
FIG. 5 is a cross-sectional view of the second tubular body of FIG. 3 in an assembled state.

FIG. 5 is a cross-sectional view of an assembled second tubular body 90. As shown, guides 92 are inserted into bores 93 and secured by collar 94 such that a portion of the guide 92 protrudes into the inner cavity of the third portion 91. As discussed below, the guide(s) 92 are configured to engage the tracks 82 of the first tubular body 80. The sidewalls of the fourth portion 95 define internal recess 96, inner protrusion 98, and an angled transition 97 that tapers between the internal recess 96 and the inner protrusion 98. The second tubular body 90 also includes an internal shoulder 99 positioned between the third portion 91 and fourth portion 95.

Figure 6:
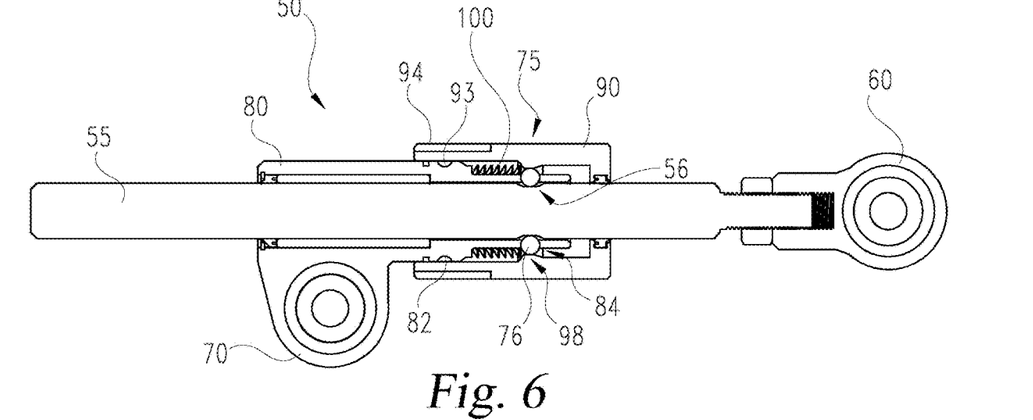
FIG. 6 is a cross-sectional view of an embodiment of a sway bar link in a first position.
Figure 7:
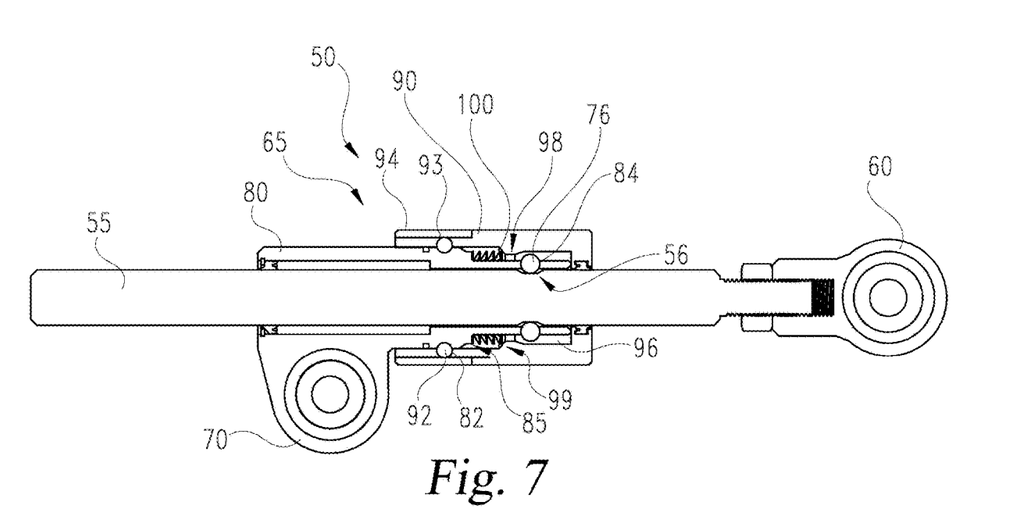
FIG. 7 is a cross-sectional view of the sway bar link of FIG. 6 in a second position.
Figure 8:
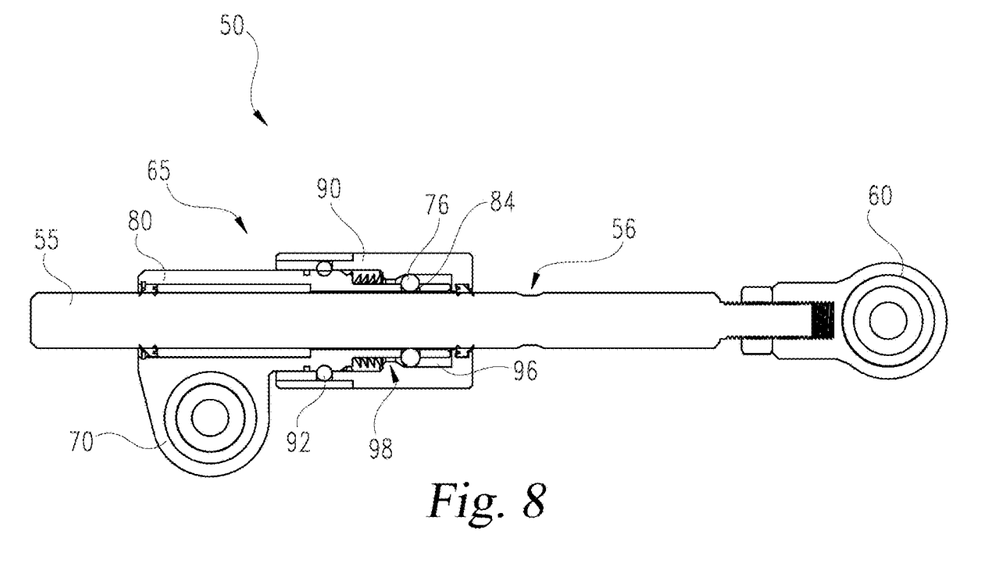
FIG. 8 is a cross-sectional view of the sway bar link of FIG. 7 wherein the slide has moved relative to the shaft.

Referring now to FIGS. 6, 7, and 8, the relative position of components of slide 65 are shown in both engaging and disengaging configuration of the slide 65 relative to shaft 55 to allow or arrest movement of said slide 65 relative to shaft 55 is shown. In FIG. 6, the disconnectable sway bar link 50 is shown in a first state, locked state, engaged state, etc. In the first state, the locking member 76 is biased to engage notch 56 through hole 84 of the first tubular body 80 to arrest movement of slide 65 relative to shaft 55. In the first state, the slide 65 is moveable relative to shaft 55 unless the locking member 76 of detent mechanism 75 is engaged with notch 56.

In this embodiment, the spring 100 biases the angled transition 97 of the second tubular body 90 against locking member 76 which biases the locking member 76 inwardly to engage notch 56. In the first state, the guide(s) 92 are in the first longitudinal position of the track 82. Said differently, when the guide(s) 92 is in the first longitudinal position of track 82, the locking member 76 is biased to engage notch 56 by angled transition 97 internal protrusion 98 of the second tubular body 90. The spring 100 is located between the external shoulder 85 of the first tubular body 80 and the internal shoulder 99 of the second tubular body 90. The spring 100 is configured to bias the first tubular body 80 relative to the second tubular body 90 (via the guide(s) 92 and track 82) towards the first state such that the locking member 76 engages notch 56.

In FIG. 7, the disconnectable sway bar link 50 is shown in a second state, open state, unlocked state, disengaged state, etc. As shown, guide(s) 92 are in the second longitudinal position of track 82, positions first tubular body 80 closer to second tubular body 80, thereby compressing spring 100 between external shoulder 85 and internal shoulder 99 and disengaging angled transition from pushing against locking member 76. The state of slide 65 is changed from the first state to the second state by sliding and rotating the first tubular body 80 relative to the second tubular body 90. This movement consequently alters the location of the guide(s) 92 from the first longitudinal position to the second longitudinal position within track 82. In other embodiments, the link 50 is alternated between the first and second state by rotating and sliding the second tubular body 90 relative to the first tubular body 80.

In the second state/at the second longitudinal position, the locking member 76 is not biased to engage notch 56. While locking member 76 could move into notch 56, without engagement by angled transition 97 and/or internal protrusion 98, locking member 76 does not block movement of shaft 55 relative to detent mechanism 75 thereby allowing movement of slide 65 relative to the shaft 55. In this second state, the spring 100 is compressed between the external shoulder 85 of the first tubular body 80 and the internal shoulder 99 of the second tubular body 90.

As shown in FIG. 7, the locking member 76 occupies the internal recess 96 of the second tubular body 90. At FIG. 8, the slide 65 of the disconnectable sway bar link 50 has been moved relative to shaft 55. As shown, the locking member 76 is not biased into the notch 56 and can remain within internal recess 96. Spring 100 is compressed between external shoulder 85 and internal shoulder 99 and does not push angled transition 97 against locking member 76.

Figure 9:
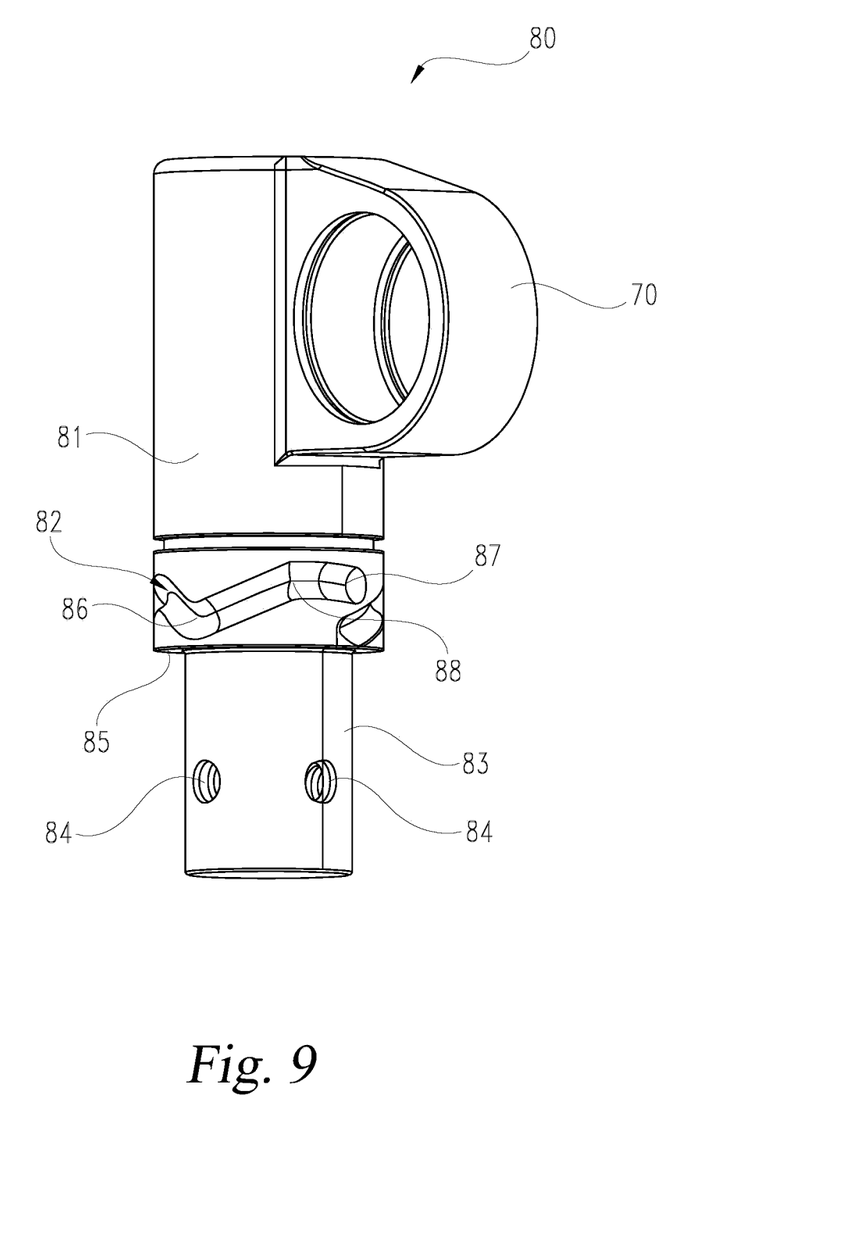
FIG. 9 is a perspective view of the first tubular body of FIG. 3.

FIG. 9 illustrates a perspective view of first tubular body 80. In particular, track 82 is shown. Track 82 defines first position 86, second position 87 and ridge 88 positioned between first position 86 and second position 87. First position 86 is longitudinally offset relative to second position 87. Ridge 88 is longitudinally offset relative to both first and second positions 86 and 87. The biasing force of spring 100 urges guide 92 toward the portion of track 82 as close as possible to shoulder 85, which can include inducing relative rotation between first tubular body 80 and second tubular body 90.

When guide 92 is positioned at first position 86, the disconnectable sway bar link 50 is in the first state. When guide 92 is positioned at the second position 87, the disconnectable sway bar link 50 is in the second state. When guide 92 is positioned at first position 86, spring 100 urges guide 92 to remain at first position 86 due to the upward slope of track 82 on either side of first position 86. When guide 92 is positioned at second position 87, spring 100 urges guide 92 to remain at second position 87 due to the end of track 82 at second position 87 and the upward slope of track 82 on the other side.

In order move guide 92 between first position 86 and second position 87, a user has to rotate first tubular body relative to second tubular body while overcoming the biasing force of spring 100 to pass guide 92 over and across ridge 88 in track 82. Ridge 88 and spring 100 generally prevents detent mechanism 75 from moving between the first and second states without a user manually forcing the change against the biasing force of spring 100.

The biasing force of spring 100 can be selected so that a user can move detent mechanism 75 between the first and second states without using tools. Alternatively, the biasing force of spring 100 can be selected such that a user generally requires a tool to provide sufficient force to move detent mechanism 75 between the first and second states.

Altering the disconnectable sway bar link 50 from the first state to the second state changes the disconnectable sway bar link 50 from a rigid link to a flexible link, respectively. This allows an operator to selectively configure the disconnectable sway bar link 50 depending on the driving conditions and terrain encountered by the vehicle. This process also allows such a change from a rigid configuration to a flexible configuration without the need for removing and/or adding parts to lock/unlock the link 50.

Furthermore, disconnectable sway bar link 50 can be placed in the first state regardless of the relative position of detent mechanism 75 relative to shaft 55. Locking mechanism 76 will be biased to engage with notch 56 when disconnectable sway bar link 50 is placed in the first state, even if locking mechanism 76 is not aligned with notch 56. In the first state, as soon locking mechanism 76 is aligned with notch 56, locking mechanism 76 will engage notch 56. This permits the user to place disconnectable sway bar link 50 in the first state regardless of the position of detent mechanism 75 relative to shaft 55.

Figure 10:
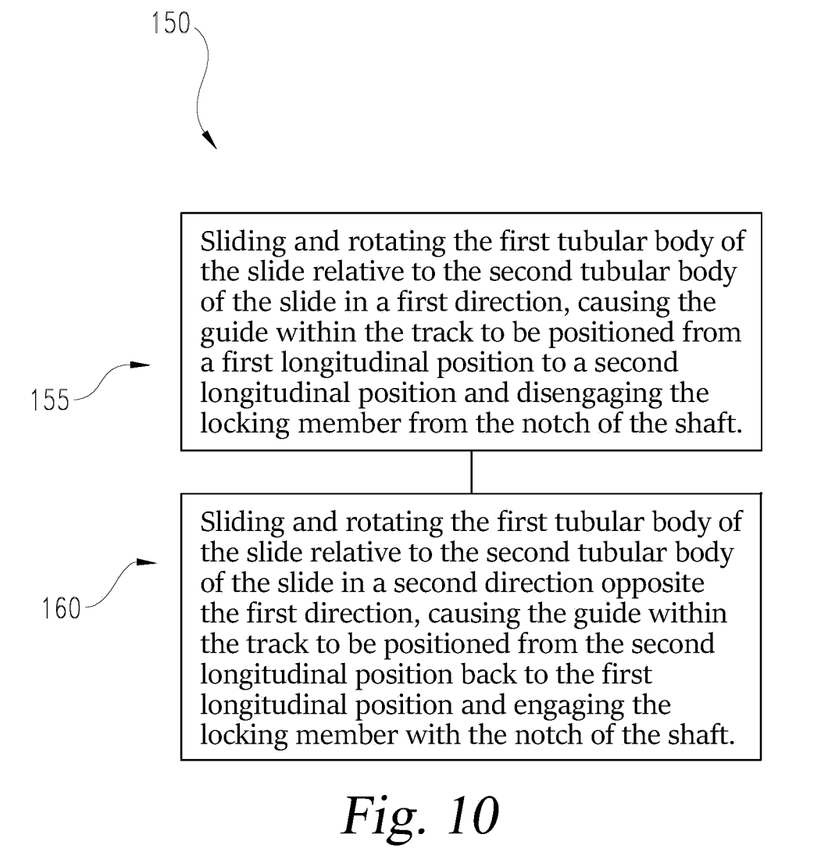
FIG. 10 is a flow chart diagram of a method of altering a sway bar link between a rigid state and a flexible state, and vice versa.

FIG. 10 is a flow chart diagram of a method 150 of changing the state/configuration of a disconnectable sway bar link according to the present disclosure. At 155, the disconnectable sway bar link 50 is in a first/rigid state. In this embodiment, the link 50 is configured from the first state to the second state by simultaneously sliding and rotating the first tubular body of the slide in a first direction relative to the second tubular body of the slide. Sliding and rotating the first tubular body in the first direction causes the guide(s) within the track to alter their location from the first longitudinal position to the second longitudinal position. In the second state/at the second longitudinal position, the locking member is disengaged from the notch of the shaft and received within the internal recess of the second tubular body. Disengagement of the locking member from the shaft allows the slide to move relative to the shaft, providing a flexible sway bar link.

At 160, to configure the disconnectable sway bar link 50 back to the first state, the first tubular body is slid and rotated in a second direction, opposite the first direction. This causes the guide(s) to be placed back in the first longitudinal position of the track, which forces the locking member to engage with the notch, arresting movement of the slide relative to the shaft and providing a rigid sway bar link.

While the invention has been described in detail in the foregoing description, the same is to be considered as illustrative and not restrictive in character, it being understood that all changes and modifications that come within the spirit of the invention are desired to be protected. In addition, all references cited herein are indicative of the level of skill in the art and are hereby incorporated by reference in their entirety.

What is claimed:

1. A selectively engageable sway bar link for a vehicle, the sway bar link comprising:
   a shaft comprising a first mounting point, the shaft defining a notch, wherein the notch is spaced apart from the first mounting point;
   a slide comprising a second mounting point and a detent mechanism, wherein the shaft extends through the slide, wherein the slide is selectively movable along a length of the shaft;
   wherein the detent mechanism comprises a locking member that, in a first state, engages the notch on the shaft to arrest movement of the slide relative to the shaft and, in a second state, does not engage the notch, and wherein, in the first state, the slide is moveable relative to the shaft unless the locking member is longitudinally aligned with the notch in the shaft;
   a first tubular body;
   a second tubular body that is movable relative to the first tubular body, wherein the shaft extends through the first and second tubular bodies;
   a track and a guide that cooperate to constrain movement of the second tubular body relative to the first tubular body, wherein movement of the guide relative to the track is constrained by the track, wherein the track extends radially around a portion of either the first or second tubular body between a first longitudinal position and a second longitudinal position that is longitudinally offset from the first longitudinal position, wherein the guide is coupled to the one of the first or second tubular body that does not include the track; and
   a spring that biases the first tubular body relative to the second tubular body, wherein, when the guide is in the first longitudinal position, the locking member is biased against the shaft and wherein, when the guide is in the second longitudinal position, the locking member is not biased.

2. The selectively engageable sway bar link of claim 1, wherein, in the first state, the locking member is biased to engage the notch.

3. The selectively engageable sway bar link of claim 1, wherein the notch is a groove that extends around the shaft.

4. The selectively engageable sway bar link of claim 1, wherein the spring biases the guide relative to the track toward the first longitudinal position.

5. The selectively engageable sway bar link of claim 1, wherein the first tubular body includes a second portion defining a hole and wherein the locking member selectively extends through the hole when the locking member is biased against the shaft.

6. The selectively engageable sway bar link of claim 5, wherein the locking member is a spherical bearing that is positioned in the hole.

7. The selectively engageable sway bar link of claim 6, wherein the first tubular body comprises a first portion that defines the track, the second portion, and an external shoulder positioned between the first and second portions;
wherein the second tubular body comprises a third portion that defines the guide, a fourth portion that defines an internal recess, an internal protrusion, an angled transition between the internal recess and the internal protrusion and an internal shoulder positioned between the third and fourth portions;
wherein the spring is positioned between the external shoulder and the internal shoulder;
wherein, when the guide is in the second longitudinal position, the spring is compressed and the bearing is positioned in the internal recess; and
wherein, when the guide is in the first longitudinal position, the spring biases the angled transition against the bearing which biases the bearing to extend through the hole.

8. The selectively engageable sway bar link of claim 7, wherein, when the guide is in the first longitudinal position and the hole is aligned with the notch, the bearing is constrained between the notch and the internal protrusion.

9. The selectively engageable sway bar link of claim 1, wherein the detent mechanism is moved between the first state and the second state by rotating the first tubular body relative to the second tubular body.

10. The selectively engageable sway bar link of claim 1, wherein the spring comprises a plurality of wave disk springs.

11. The selectively engageable sway bar link of claim 1, wherein the detent mechanism is movable between the first and second states without removing any component piece of the assembly.

12. The selectively engageable sway bar link of claim 1, wherein, in the first state with the locking member aligned with the notch, the selectively engageable sway bar link provides a stiff sway bar link.

13. The selectively engageable sway bar link of claim 1, wherein, in the second state, the selectively engageable sway bar link provides a translatable sway bar link.

14. The selectively engageable sway bar link of claim 1, wherein the track is a channel defined in one of the first or second tubular bodies.

15. The selectively engageable sway bar link of claim 14, wherein the guide is a protrusion on one of the first or second tubular bodies that is positioned within the channel.

16. The selectively engageable sway bar link of claim 15, wherein the guide is a spherical bearing.

17. A method of locking a selectively engageable sway bar link, the method comprising:
providing the selectively engageable sway bar link of claim 4; and
simultaneously sliding and rotating the first tubular body relative to the second tubular body.

18. A method of unlocking a selectively engageable sway bar, the method comprising:
providing the selectively engageable sway bar link of claim 4; and
simultaneously sliding and rotating the first tubular body relative to the second tubular body.

\* \* \* \* \*